No. 688,045. Patented Dec. 3, 1901.
A. J. WILSON.
ELECTRIC SIGNALING SYSTEM FOR RAILWAYS.
(Application filed May 23, 1900.)
(No Model.)
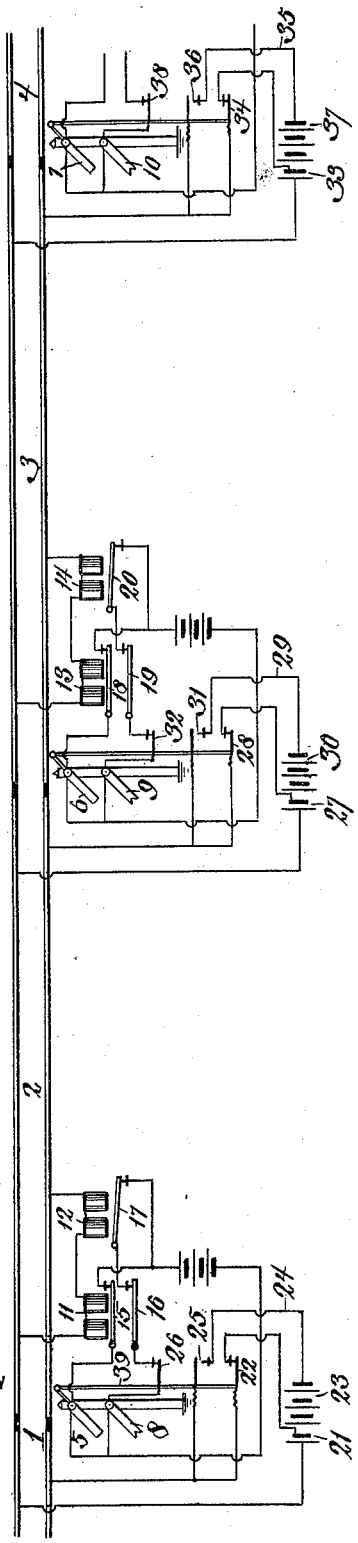
WITNESSES:
Nicholas M. Goodlett
John O. Templer
INVENTOR
Adoniram J. Wilson
BY
Kenyon & Kenyon
ATTORNEYS.
THE NORRIS PETERS CO., PHOTO-LITHO., WASHINGTON, D. C.

UNITED STATES PATENT OFFICE.

ADONIRAM J. WILSON, OF WESTFIELD, NEW JERSEY, ASSIGNOR TO HALL SIGNAL COMPANY, A CORPORATION OF MAINE.

ELECTRIC SIGNALING SYSTEM FOR RAILWAYS.

SPECIFICATION forming part of Letters Patent No. 688,045, dated December 3, 1901.

Application filed May 23, 1900. Serial No. 17,645. (No model.)

*To all whom it may concern:*

Be it known that I, ADONIRAM J. WILSON, a citizen of the United States, and a resident of Westfield, county of Union, and State of New Jersey, have invented new and useful Improvements in Electric Signaling Systems for Railways, of which the following is a specification.

This invention relates to improvements in electric signaling systems for railways.

Among the objects of the invention is to provide an efficient and economical system and one in which line-wires may be dispensed with.

The invention also seeks to provide for the use of home and distant signals. The signals themselves may be of any type desired. For example, they may be of the inclosed-disk type or of the exposed-blade type, and the power for operating the signals may be derived from electrical devices or motors or from water or air under pressure or from other suitable apparatus. In some cases the battery or other generator in the signal-circuits may be employed to operate the signals, and in other cases the signal-circuits may be employed to bring the signals into operative connection with other generators for the purpose of operating the signals.

In the accompanying drawing I have shown in diagram two complete blocks of a system in which home and distant signals are employed, the signals being arranged normally at "safety."

Referring now to the particular arrangement as shown in the drawing, 1, 2, 3, and 4 indicate the blocks of the track, insulated from each other in the usual manner. At the entrance of the blocks 2, 3, and 4 are located the home signals 5, 6, and 7.

8, 9, and 10 are distant signals, also located at the entrance of the blocks 2, 3, and 4. The rails of the block 2 are included in a circuit containing the magnets 11 and 12. The rails of the block 3 are included in a rail-circuit containing magnets 13 and 14. The circuit for the home signal 5 contains the circuit-controller 15, operated by the magnet 11. The circuit-controller for the distant signal 8 includes the circuit-controllers 16 and 17, the former being operated by the magnet 11 and the latter by the magnet 12. The circuit of the home signal 6 and the circuit of the distant signal 9 contain, respectively, the circuit-controller 18 and 19, operated by the magnet 13. The circuit of the distant signal 9 also contains a circuit-controller 20, operated by the magnet 14. The rail-circuit of the block 2 is normally closed at the circuit-controller 28, the circuit including also a generator of a given capacity, such as the battery 27. An additional battery 30 is connected in a branch 29 through the normally open circuit-controller 31 with the circuit of the block 2, the arrangement being such that when the rail-circuit is in its normal condition the circuit-controller 28 will be closed with the battery 27 in the rail-circuit and the branch 29 will be open at the circuit-controller 31, with the battery 30 cut out of the rail-circuit. When the circuit-controller 28 is open and the circuit-controller 31 is closed, both batteries 27 and 30 will be included in the rail-circuit. The magnet 11 is so constructed that it will be responsive to the current of the battery 27 or the normal current of the circuit, so as to hold the circuit-controllers 15 and 16 closed against their front contacts. The magnet 12 is so constructed as to be unresponsive to the battery 27 or the normal current of the circuit, so that its circuit-controller 17 is closed against its back contact. The magnet 12, however, is responsive to the current of the battery 30 or the current of the batteries 27 and 30 combined, and when the circuit-controller 31 is closed the magnet becomes responsive and opens the circuit-controller 17. The rail-circuits for the several blocks have the same arrangement and mode of operation as that described for block 2. The rail-circuit of block 1 is normally closed through the circuit-controller 22 and the battery 21 of limited capacity and has a branch normally open at the circuit-controller 25, which includes the additional battery 23. The rail-circuit of the block 3 is normally closed through the circuit-controller 34 and the battery 33 of limited capacity and has a branch 35, normally open at the circuit-controller 36, which includes the additional battery 37.

The distant-signal circuits include, respectively, the normally closed circuit-controllers 26, 32, and 38. The circuit-controllers 22, 25, and 26 are mechanically operated by the home signal 5 and for this purpose may be connected to the signal blade or disk, as by a rod 39. This connection is so arranged that when the signal 5 is at "safety" the circuit-controllers 22 and 26 will be closed and the circuit-controller 25 open, and when the signal 5 is at "danger" the positions of the circuit-controllers will be reversed. The home signal 6 is connected with the circuit-controllers 28, 31, and 32 in the same way, and the signal 7 is connected with the circuit-controllers 34, 36, and 38 in the same way. It will be observed that in the normal condition of the system the signal-circuits, both home and distant, are closed, all the signals standing at "safety."

The operation of the system, as shown in the drawings, is as follows: A train entering the block 2 shunts the rail-circuit of the block and deënergizes the magnet 11, thereby opening the circuit of the home signal 5 at 15 and the circuit of the distant signal 8 at 16. The signals then go to "danger," generally by gravity, behind the train. Upon the home signal 5 going to "danger" the circuit-controllers 22 and 26 are opened and the circuit-controller 25 is closed. When the train leaves the block 2, the magnet 11 then becomes responsive and the circuit of the home signal 5 is closed at 15, thereby causing or permitting the home signal 5 to go to "safety" and shifting the circuit-controllers 22, 25, and 26 to their normal positions. The circuit-controller 16 of the circuit of the distant signal 8 is also closed by the magnet 11; but this signal-circuit is opened at the circuit-controller 17 as soon as the train enters the block 3, so that the distant signal 8 is still held at "danger" behind the train and remains in this condition as long as the train is in block 3, as will now appear. As the train enters the block 3 it puts the signals 6 and 9 to "danger" by opening the circuit-controllers 18 and 19. Upon the home signal 6 going to "danger" the circuit-controllers 28, 31, and 32 are shifted so that the batteries 27 and 30 are included in the rail-circuit of the block 2. The increased current in this rail-circuit makes responsive the magnet 12, which opens the circuit-controller 17 in the circuit of the distant signal 8. The home signal 6 remains at "danger," of course, as long as the train is in block 3, so that during this time and until the train has passed out of block 3 the magnet 12 is responsive, and the distant signal 8 remains at "danger." When the train enters the block 4, the signals 7 and 10 go to "danger," and when the train has left the block 3 the home signal 6 goes to "safety." The movement of the home signal 6 to "safety" shifts the circuit-controllers 28, 31, and 32 back to normal position. The circuit-controller 31, being thus opened, renders the magnet 12 unresponsive and closes at 17 the circuit of the distant signal 8, which thereupon goes to "safety." It will thus be seen that a home signal remains at "danger" while the train is in the block immediately in advance and that a distant signal remains at "danger" while the train is in the two blocks next in advance of the signal.

My invention (or various features of it) is capable of embodiment in various arrangements. For example, I may employ only one set of signals for the blocks instead of employing both home and distant signals, using the signals 8, 9, and 10 as ordinary stop-signals for overlapping blocks. This will be understood when it is borne in mind that the signals 8, 9, and 10 remain at "danger" behind the train while the train is in the two blocks in advance thereof, so that the blocks would be true overlapping blocks if the signals 8, 9, and 10 were alone used. It will also be observed that a distant signal is not able to clear after a train has passed until after the preceding home signal has began to clear, so that the system overcomes the possibility of having a home signal at "danger," as the signal 6, guarding the block 3, while the distant signal stands at "safety," as the signal 8, which also guards the block 3. This is done by having the movement of the home signal to "safety" shift the circuit-controller into the position which initiates the movement to "safety" of the distant signal in the rear. By this arrangement any defect in the circuits or in the mechanical operation of the home signal which keeps it at "danger" will also keep the distant signal at "danger."

It will be seen that the magnets of the respective rail-circuits—as, for example, magnets 11 and 12—are connected in series in the rail-circuit. In arranging the magnets so that the magnet 11 will be responsive and the magnet 12 will be unresponsive to a given current in the rail-circuit and so that an increase in the current will render both magnets responsive, I construct the magnet 11 so as to have a greater magnetic power for a given current than the magnet 12, as herein shown, and I increase and decrease the current by increasing and decreasing battery-power. I may, however, accomplish the same result of increasing and decreasing the current of the rail-circuit by cutting out and cutting in resistance. The magnets 11 and 12 may be made responsive in different degrees to a given current by winding one with more turns of wire than the other or by increasing or decreasing the power of one or the other by a permanent magnet or by the employment of springs or weights of different capacities to withstand the attractive powers of the magnets. In referring to a magnet as being "responsive to current," I mean responsive so as to attract its armature and the contact carried thereby. As shown, the responsiveness and unresponsiveness of magnets 11 and 12 are due to variations in the strength of the current employed. Such responsiveness or unresponsiveness may be effected by other variations in the current than those merely of strength. Any variations in the current or in its character may be made use of which will make said magnets responsive or unresponsive. In some cases I may employ certain features of my invention with signals standing normally at "danger" and may also employ, in some cases, signal-circuits normally open instead of normally closed.

The home and distant signals at the entrance of a block are preferably arranged to be operated by a single motor normally in loose connection with the signals, but arranged to be automatically put into operative connection with either signal, as required.

What I claim as new, and desire to secure by Letters Patent, is—

1. In an electrical signaling system, the combination of a home signal and a distant signal both located at the entrance of a block; a circuit for the home signal; a circuit for the distant signal; a rail-circuit; means in said rail-circuit operated by the home signal for controlling the circuit of the distant signal, whereby the distant signal cannot go to safety unless the home signal is at safety.

2. In an electrical signaling system, the combination of a home signal and a distant signal both located at the entrance of a block; a circuit for the home signal; a circuit for the distant signal; means operated by the home signal for controlling the circuit of the distant signal, whereby the distant signal cannot go to safety unless the home signal is at safety; and a rail-circuit controlling said signal-circuits and containing two magnets, one of which magnets controls the circuit of the home signal and is responsive to a given current, and the other of which magnets controls the circuit of the distant signal and is unresponsive to said given current; and means for varying the current in said rail-circuit and thereby operating one or both of said magnets.

3. In an electrical signaling system, the combination of a home signal and a distant signal both located at the entrance of a block; a circuit for the home signal; a circuit for the distant signal; means operated by the home signal for controlling the circuit of the distant signal, whereby the distant signal cannot go to safety unless the home signal is at safety; and a rail-circuit controlling said signal-circuits and containing two magnets, one of which magnets controls the circuit of the home signal and is responsive to a given current, and the other of which magnets controls the circuit of the distant signal and is unresponsive to said given current; a signal in advance of said home and distant signals, and means controlled by said signal in advance for varying the current in said rail-circuit and thereby operating one or both of said magnets.

4. In an electric block-signaling system, the combination of home and distant signals at the entrance of each block; a circuit for each home signal; a circuit for each distant signal; means operated by a home signal at the entrance of a block for controlling the circuit of the distant signal at the entrance of the same block; a rail-circuit for each block containing two magnets, one of which is responsive to a given current and controls the circuit of the home signal and the other of which is unresponsive to said given current and controls the circuit of the distant signal, and means operated by the home signal in advance for varying the current of said rail-circuit and thereby making responsive one or both of said magnets.

5. In an electrical signaling system, the combination of a signal, a circuit for said signal containing two circuit-controllers; a rail-circuit containing two magnets for said circuit-controllers, one of said magnets being responsive and the other unresponsive to a given current; a signal in advance of the first-mentioned signal; and means operated by said signal in advance for varying the current in said rail-circuit.

6. In an electrical signaling system, the combination of a signal, a circuit for said signal containing two circuit-controllers; a rail-circuit containing two magnets for said circuit-controllers, one of said magnets being responsive and the other unresponsive to a given current; a signal in advance of the first-mentioned signal; means operated by said signal in advance for varying the current in said rail-circuit, and a rail-circuit in advance of said last-mentioned signal controlling the movement thereof.

7. In an electrical signaling system, the combination of a signal, a signal-circuit containing two circuit-controllers; a normally closed rail-circuit containing two magnets for said circuit-controllers, one of said magnets being responsive and the other unresponsive to the normal current of the rail-circuit; a signal in advance of said first-mentioned signal; and means operated by said signal in advance for increasing and decreasing the current in said rail-circuit.

8. In an electrical signaling system, the combination of a signal, a signal-circuit containing two circuit-controllers; a normally closed rail-circuit containing two magnets for said circuit-controllers, one of said magnets being responsive and the other unresponsive to the normal current of the rail-circuit; a signal in advance of said first-mentioned signal; means operated by said signal in advance for varying the current in said rail-circuit; and a rail-circuit in advance of said last-mentioned signal controlling the movement thereof.

9. In an electrical signaling system, the combination of a distant signal; a circuit therefor having two circuit-controllers; a rail-circuit having two magnets for said circuit-controllers, one of said magnets being responsive and the other unresponsive to a given current in the rail-circuit; a home signal in advance of the distant signal and means operated by said home signal for varying the current in the rail-circuit, whereby the condition of the distant signal is dependent upon the position of the home signal.

10. In an electrical signaling system, the combination of a distant signal; a circuit therefor having two circuit-controllers, a rail-circuit having two magnets for said circuit-controllers, one of said magnets being responsive and the other unresponsive to a given current in the rail-circuit; a home signal in advance of the distant signal and means operated by said home signal for varying the current in the rail-circuit, whereby the condition of the distant signal is dependent upon the position of the home signal, and a rail-circuit controlling the position of the home signal.

11. In an electrical signaling system the combination of home and distant signals; a circuit for the home signal; a circuit containing two circuit-controllers for the distant signal; a rail-circuit having two magnets for said circuit-controllers, one of said magnets being responsive to a given current in the rail-circuit and controlling the circuit of the home signal and also one of the circuit-controllers of the distant-signal circuit, the other of said magnets controlling the other circuit-controller of the distant-signal circuit and being unresponsive to the said given current in the rail-circuit; and means controlled by a train from a point in advance for varying the current in the rail-circuit, whereby a train on passing the signals causes both to stand at danger and as the train passes beyond a point in advance permits the home signal to go to safety and holds the distant signal at danger until it has passed a point farther in advance.

12. In an electrical signaling system the combination of home and distant signals; a circuit for the home signal; a circuit containing two circuit-controllers for the distant signal; a normally closed rail-circuit having two magnets for said circuit-controllers, one of said magnets being responsive to the normal current of the rail-circuit and controlling the circuit of the home signal and also one of the circuit-controllers of the distant-signal circuit, the other of said magnets controlling the other circuit-controller of the distant-signal circuit and being unresponsive to the said normal current of the rail-circuit; and means controlled by a train from a point in advance for varying the current in the rail-circuit, whereby a train on passing the signals causes both to stand at danger and as the train passes beyond a point in advance permits the home signal to go to safety and holds the distant signal at danger until it has passed a point farther in advance.

13. In a block-signaling system the combination of two blocks of a track; home signals for the blocks; a distant signal controlled by a train in both blocks; a circuit for each home signal; a circuit for the distant signal having two circuit-controllers; a rail-circuit for the first block having two magnets, one magnet controlling the home-signal circuit for the first block and one of the circuit-controllers of the distant-signal circuit and being responsive to a given current in the rail-circuit, the other of said magnets being unresponsive to said given current in the rail-circuit and controlling the other circuit-controller of the distant-signal circuit; and a rail-circuit for the second block controlling the home signal for the second block; and means controlled by the rail-circuit for the second block for varying the current of the rail-circuit of the first block.

14. In a block-signaling system the combination of two blocks of a track; home signals for the blocks; a distant signal controlled by a train in both blocks; a circuit for each home signal; a circuit for the distant signal having two circuit-controllers; a rail-circuit for the first block having two magnets, one magnet controlling the home-signal circuit for the first block and one of the circuit-controllers of the distant-signal circuit and being responsive to a given current in the rail-circuit, the other of said magnets being unresponsive to said given current in the rail-circuit and controlling the other circuit-controller of the distant-signal circuit; and a rail-circuit for the second block controlling the home signal for the second block; and means operated by the home signal for the second block for varying the current of the rail-circuit of the first block.

15. In a block-signaling system the combination of a series of blocks; home and distant signals located at the entrance of the blocks; a circuit for each home signal; a circuit containing two circuit-controllers for each distant signal; a rail-circuit for each block containing two magnets, one magnet controlling a home-signal circuit and also one of the circuit-controllers of a distant-signal circuit and being responsive to a given current in its rail-circuit, the other magnet of said rail-circuit being unresponsive to said given current and controlling the other circuit-controller of said distant-signal circuit; and means for varying the current of each rail-circuit in the series controlled by the rail-circuit in advance.

16. In a block-signaling system the combination of a series of blocks; home and distant signals located at the entrance of the blocks; a circuit for each home signal; a circuit containing two circuit-controllers for each distant signal; a rail-circuit for each block containing two magnets, one magnet controlling a home-signal circuit and also one of the circuit-controllers of a distant-signal circuit and being responsive to a given current in its rail-circuit, the other magnet of said rail-circuit being unresponsive to said given current and controlling the other circuit-controller of said distant-signal circuit; and means for varying the current of each rail-circuit in the series operated by the home signal in advance.

17. In a block-signaling system the combination of two blocks of a track; home signals for the blocks; a distant signal controlled by a train in both blocks; a circuit for each home signal; a circuit for the distant signal having two circuit-controllers; a normally closed rail-circuit for the first block having two magnets, one magnet controlling the home-signal circuit for the first block and one of the circuit-controllers of the distant-signal circuit and being responsive to a normal current in the rail-circuit, the other of said magnets being unresponsive to said normal current in the rail-circuit and controlling the other circuit-controller of the distant-signal circuit; and a rail-circuit for the second block controlling the home signal for the second block; and means controlled by the rail-circuit for the second block for varying the normal current of the rail-circuit of the first block.

18. In a block-signaling system, the combination of a series of blocks; home and distant signals standing normally at safety located at the entrance of the blocks; a normally closed circuit for each home signal; a normally closed circuit containing two circuit-controllers for each distant signal; a rail-circuit for each block containing two magnets, one magnet controlling a home-signal circuit and also one of the circuit-controllers of a distant-signal circuit and being responsive to a given current in its rail-circuit, the other magnet of said rail-circuit being unresponsive to said given current and controlling the other circuit-controller of said distant-signal circuit; and means for varying the current of each rail-circuit in the series controlled by the rail-circuit in advance.

19. In an electrical signaling system, the combination of a normally closed signal-circuit containing two circuit-controllers; a normally closed rail-circuit containing two magnets for said circuit-controllers; one of said magnets being responsive and the other unresponsive to a given current; and means for varying the current in the rail-circuit to make responsive both or one of said magnets and thereby affect the signal-circuit.

20. In an electrical signaling system, the combination of a signal standing normally at safety, a normally closed circuit for said signal containing two circuit-controllers; a rail-circuit containing two magnets for said circuit-controllers, one of said magnets being responsive and the other unresponsive to a given current; a signal in advance of the first-mentioned signal; and means operated by said signal in advance for varying the current in said rail-circuit.

21. In an electrical signaling system, the combination of a distant signal standing normally at safety; a normally closed circuit therefor having two circuit-controllers; a rail-circuit having two magnets for said circuit-controllers, one of said magnets being responsive and the other unresponsive to a given current in the rail-circuit; a home signal standing normally at safety in advance of the distant signal and means operated by said home signal for varying the current in the rail-circuit, whereby the condition of the distant signal is dependent upon the position of the home signal.

22. In an electrical signaling system the combination of home and distant signals standing normally at safety; a circuit normally closed for the home signal; a normally closed circuit containing two circuit-controllers for the distant signal; a normally closed rail-circuit having two magnets for said circuit-controllers, one of said magnets being responsive to the normal current of the rail-circuit; and controlling the circuit of the home signal and also one of the circuit-controllers of the distant-signal circuit, the other of said magnets controlling the other circuit-controller of the distant-signal circuit and being unresponsive to the said normal current of the rail-circuit; and means controlled by a train from a point in advance for varying the current in the rail-circuit, whereby a train on passing the signals causes both to stand at danger and as the train passes beyond a point in advance permits the home signal to go to safety and holds the distant signal at danger until it has passed a point farther in advance.

23. In an automatic electric signaling system, the combination of a distant signal; a circuit for the distant signal having a circuit-controller; a circuit containing a normally unresponsive magnet operating said circuit-controller for putting said signal to safety; a home signal in advance of said distant signal; and means controlled by the movement of the home signal to safety for making responsive said magnet, whereby the home signal must go to safety before the distant signal can go to safety.

24. In an electrical signaling system the combination of home and distant signals; a circuit for the home signal; a circuit containing two circuit-controllers for the distant signal; a circuit having two magnets for said circuit-controllers, one of said magnets being responsive to a given current in the said circuit and controlling the circuit of the home signal and also one of the circuit-controllers of the distant-signal circuit, the other of said magnets controlling the other circuit-controller of the distant-signal circuit and being unresponsive to the said given current in its own circuit; and means controlled by a train for varying the current in the circuit having the two magnets, whereby a train on passing the signals causes both to stand at danger and as the train passes beyond a point in advance permits the home signal to go to safety and holds the distant signal at danger until it has passed a point farther in advance.

25. In an electrical signaling system the combination of home and distant signals; a circuit for the home signal; a circuit containing two circuit-controllers for the distant signal; a rail-circuit having two magnets for said circuit-controllers, one of said magnets being responsive to a given current in the rail-circuit and controlling the circuit of the home signal and also one of the circuit-controllers of the distant-signal circuit, the other of said magnets controlling the other circuit-controller of the distant-signal circuit and being unresponsive to the said given current in the rail-circuit; and means controlled by a train from a point in advance for varying the current in the rail-circuit, whereby a train on passing the signals causes both to stand at danger and as the train passes beyond a point in advance permits the home signal to go to safety and holds the distant signal at danger until it has passed a point farther in advance.

In testimony whereof I have signed my name to this specification in the presence of two subscribing witnesses.

ADONIRAM J. WILSON.

Witnesses:
C. M. BARTLETT,
L. J. MCCABE.